INVENTOR.
CURT USCHMANN
BY
ATTORNEYS

Jan. 29, 1963    C. USCHMANN    3,075,456
HAY WAFER MAKING MACHINES
Filed June 1, 1959    5 Sheets-Sheet 2
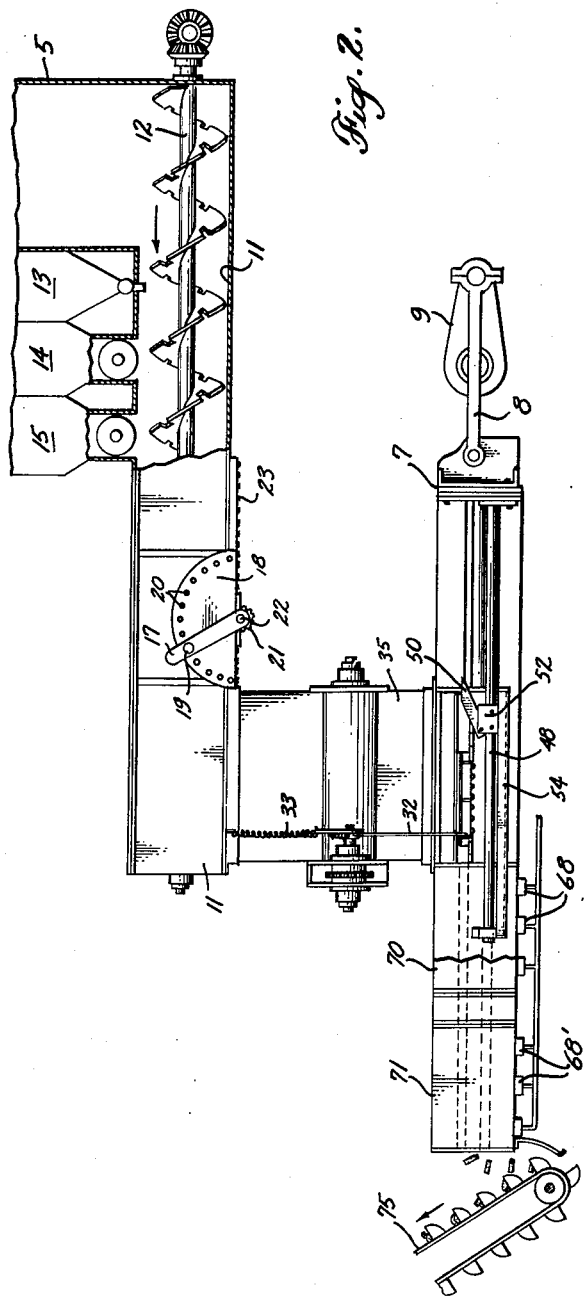
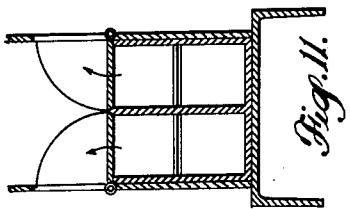
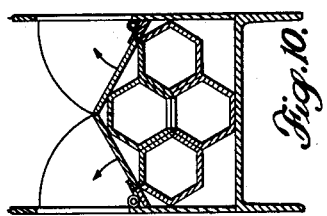
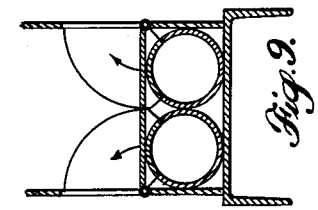
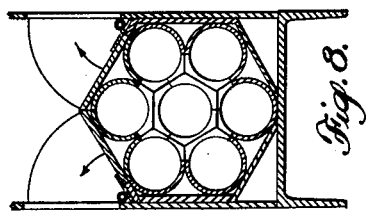
INVENTOR.
CURT USCHMANN
BY
*Reynolds, Beach & Christensen*
ATTORNEYS INVENTOR.
CURT USCHMANN
BY
Reynolds, Beach & Christensen
ATTORNEYS Jan. 29, 1963  C. USCHMANN  3,075,456
HAY WAFER MAKING MACHINES
Filed June 1, 1959  5 Sheets-Sheet 5
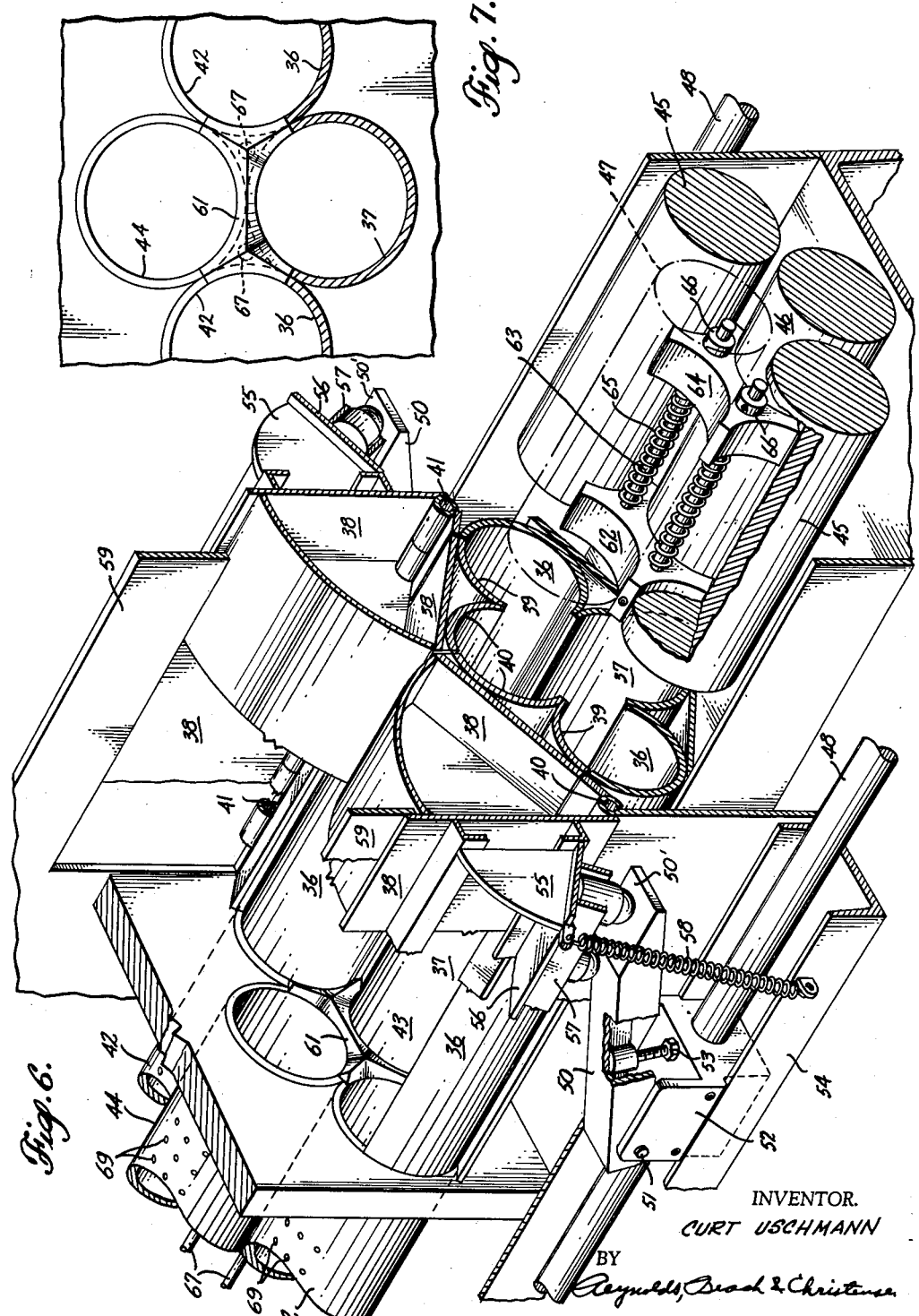
INVENTOR.
CURT USCHMANN
BY
Reynolds, Beach & Christensen
ATTORNEYS United States Patent Office 3,075,456
Patented Jan. 29, 1963

3,075,456
HAY WAFER MAKING MACHINES
Curt Uschmann, Rte. 3, Lebanon, Oreg.
Filed June 1, 1959, Ser. No. 817,161
9 Claims. (Cl. 100—138)

Hay in the form of wafers or thin cakes has definite advantages as a food for livestock. It is compact so that it can be stored, handled and transported conveniently and easily and yet it is reasonably soft so that it can be eaten readily and is palatable. By utilizing molasses or similar binder material, the nutrition value of the hay can be increased, yet such hay wafers are easy to feed and ration accurately. In addition, such feed is economical because there is no appreciable waste such as from hay in its natural form which can be pulled out of a manger or feeding trough and trampled, yet such wafers can be picked up conveniently by a feeding animal.

By the machine of the present invention, such hay wafers can be made quickly and conveniently. The wafer making mechanism is economical and it can be mounted in a hay baler and used alternately with the baler so that it is not necessary to purchase another mobile farm vehicle.

Also, the hay wafer making machine can be operated automatically by the drive mechanism of a hay baler which is a stock item of farm equipment, thus further reducing the cost of new machinery. Moreover, the wafer making machine itself is of simple and rugged construction so that it will operate with a minimum of maintenance. At the same time, this equipment will operate with less labor because the hay wafers can be conveyed easily into a mobile wagon body and it is not necessary to collect the wafers later, while it is necessary to pick up bales of hay following a hay baler.

Such a wafer making machine may include, in general, a charge-forming unit which prepares a mixture of chopped hay and binder of proper quantity to be fed into the wafer making mechanism. Such mixture is compacted and pushed into a forming tube through which it is extruded while being dried to a greater or lesser extent. Feeding of successive charges of hay and binder mixture to the forming tubes produces planes of cleavage in the mass being extruded so that the extruded shape breaks readily into individual wafers.

FIGURE 2 is a side elevation view of the wafer making machine with parts broken away.

FIGURE 6 is an enlarged top perspective view of the compacting mechanism of the machine with parts broken away.

FIGURE 7 is a fragmentary elevation view of a portion of the compacting chamber.

FIGURES 8, 9, 10 and 11 are transverse sectional views through compacting chambers of different shapes.

Figure 1:
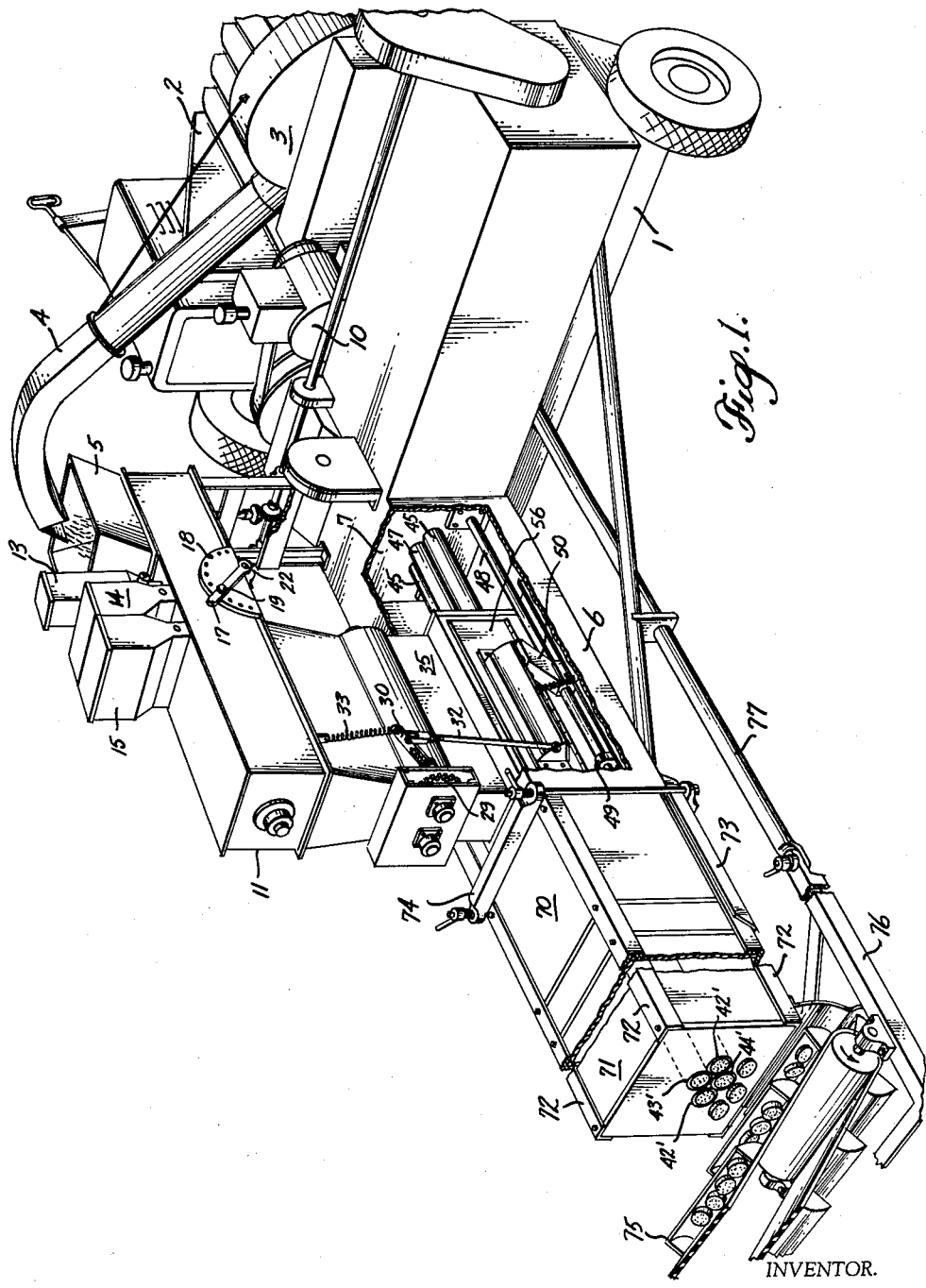
FIGURE 1 is a top perspective view of a hay baler in which a hay wafer making machine conversion device has been installed.

As mentioned above, an important feature of the present invention is that the hay wafer making machine can be made as a conversion device which can be installed in a conventional type of hay baler with a minimum of changes. In FIGURE 1 such a hay baler is shown as being mounted on a mobile chassis 1 carrying a pick-up 2 which feeds hay into a chopper 3. The chopper discharges the hay through a conduit 4 into the hopper 5 of the wafer making machine.

The wafer making machine generally is installed in the bale-compacting chamber 6 of the baler and the compacting mechanism of the wafer making machine is driven by the compacting head 7 of the hay baler which is reciprocated through the compacting chamber by the connecting rod 8 driven by the crank 9 which is rotated by the baler drive motor 10. Thus, the conventional hay baler can be used both to transport and to power the wafer making machine of the present invention.

As shown in FIGURE 2, the chopped hay entering the hopper 5 drops into the mixing conveyor 11 through which it is moved by a mixing worm 12 to the left as indicated by the arrow. During passage of the chopped hay along this conveyor, a binder such as molasses can be added to the chopped hay in measured quantity from the storage container 13. The mixture can be enriched or otherwise modified by adding other ingredients such as cereals from containers 14 and 15 in measure quantities. During movement by the worm 12 the various ingredients of the mixture are blended so as to form a substantially homogeneous mass of the desired consistency for compaction into wafers.

Depending upon the degree of compaction desired, the charge of hay mixture may be appropriately varied in size. Such charge selecting mechanism includes a slide gate 16 shown in FIGURE 3 which may be adjusted in position by swinging lever 17 into the proper position relative to the latch plate 18 in which it is held by a latching handle 19 having a spring-pressed plunger to engage in one of the holes 20. As the arm 17 is swung it will rotate the pinion 21 which is mounted concentrically with the pivot 22 mounting the arm. This pinion meshes with a rack 23 which is integral with the slide gate 16 so that, as the rack is moved lengthwise, it will shift the slide gate correspondingly to leave the desired amount of opening between the left end of the conveyor 11 and the left end of the slide plate 16 in accordance with the quantity of the charge which it is desired to deposit.

Figures 4, 5:
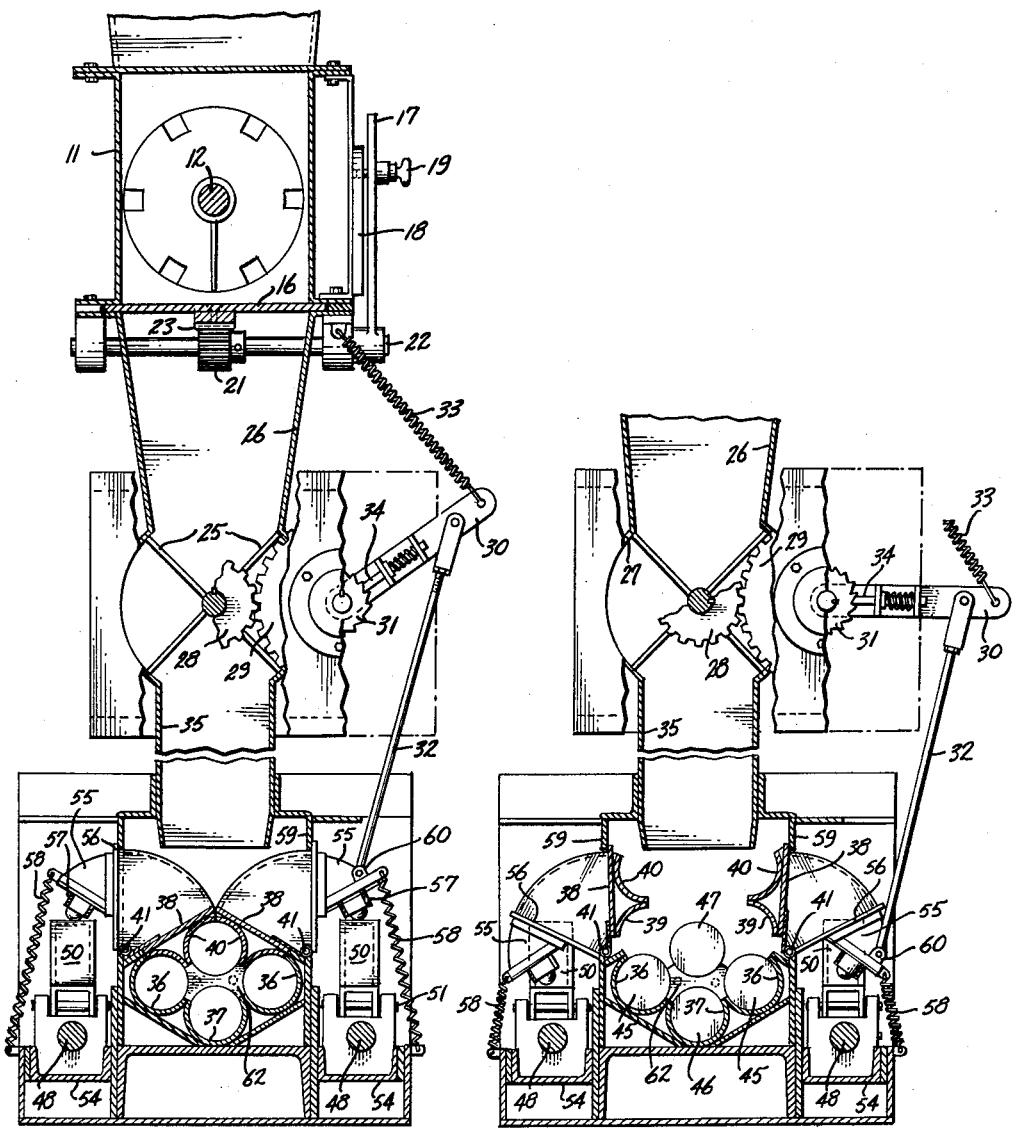
FIGURE 4 is a transverse section through the machine on line 4—4 of FIGURE 3 showing parts in one operative position and FIGURE 5 is a similar view with parts in a different operative position.

Hay mixture which drops through the open bottom of the conveyor 11 between its left end and the left end of plate 16 falls into one of the chambers formed in the charge dumper 24 by the crossed plates 25 constituting a rotary valve. The charge will drop through the throat 26 and lodge in the chamber between plates 25 which is uppermost as shown in FIGURE 4. When the charge dumper is moved to deposit the next charge, the plates 25 will swing counterclockwise as seen in FIGURES 4 and 5 through 90 degrees so that the filled upper chamber of the charge dumper will move to become the chamber at the left, in which position the charge will be confined in the chamber by the peripheral chamber wall 27. On the next movement of the plates 25 in the same direction, the chamber at the left will move into a downwardly opening position, whereupon it will deposit its charge in the compacting chamber of the machine.

The mechanism for rotating the rotary charge dumper must operate to rotate the plates 25 step-by-step through an angle of 90 degrees in each instance in synchronism with the operation of the compacting mechanism. The drive mechanism for the charge dumper includes the gear 28 mounted on the shaft which carries the plates 25. With this gear meshes the gear 29 which is of a diameter twice as great as the diameter of gear 28 so that to effect rotation of gear 28 and plates 25 through an angle of 90 degrees, it is only necessary to rotate gear 29 through an angle of 45 degrees in the opposite direction. Such rotation of gear 29 is produced by the lever 30 which actuates a ratchet 31 secured to gear 29.

To lever 30 is connected a connecting rod 32 which is movable generally lengthwise to swing arm 30. Downward movement of this arm effected by a downward pull of connecting rod 32 stretches tension spring 33 connected between the swinging end of arm 30 and the frame of the machine. As the arm 30 is swung downward, the pawl 34 will index the ratchet wheel 31 to rotate gear 29 through an angle of 45 degrees. In preparation for the next cycle of operation, the stretched spring 33 will assist in swinging lever 30 upward again from the position of FIGURE 5 to that of FIGURE 4, during which the pawl 34 ratchets to a new position relative to the ratchet wheel 31 so that when the arm 30 is swung downward again gear 29 will be rotated through another increment of 45 degrees. Such swinging of arm 30 to effect rotation of the charge dumping plates 25 is synchronized with the charge compacting stroke of the wafer making machine.

From the charge dumping mechanism, each charge in turn is dumped through a further throat 35 into the compaction chamber when it is in the open position of FIGURE 5. While the hay mixture compacting chamber can be of any of various sizes and shapes, its particular configuration should coincide with forming tubes into which the mixture is packed from the compacting chamber. In FIGURES 4 and 5 a representative shape of compaction chamber is shown which is designed to cooperate with a cluster of four forming tubes in diamond-shaped arrangement.

The bottom of the compaction chamber in FIGURES 4 and 5 is shown as being formed of three trough elements including two lateral elements 36 and a bottom element 37 in the form of tubes divided lengthwise. These troughs are assembled with their adjacent edges in contiguous contact. The upper portion of the compaction chamber is formed by two doors, each including a planar panel 38 on which are mounted trough sections. Lower troughs 39 are of a shape and are mounted on panels 38 so that when the doors are in their closed positions shown in FIGURE 4, the trough sections 39 will be disposed so that their edges abut contiguously edges of the lateral trough sections 36, respectively, and in cross section the curvature of troughs 39 will lie on the same circular arcuate curvatures as troughs 36.

Upper trough sections 40 are of similar curvature and are mounted on the panels 38 so that one edge of each trough section 40 is in contiguous engagement with the adjacent edge of a trough section 39 and the other edges of trough sections 40 are located to abut contiguously when the doors are closed as shown in FIGURE 4. Alternatively, when the doors are opened to the positions of FIGURE 5, the trough sections 39 and 40 will be swung upward and outward about the axes of the cover hinges 41 sufficiently to provide an adequate opening for a charge of hay mixture to be deposited from the charge dumper into the compaction chamber.

As shown best in FIGURES 6 and 7, the fixed trough elements 36 and 37 either are fabricated as integral portions of forming tubes or are made of the same cross-sectional size and are mounted in continuation of such tubes. In FIGURE 6 each of the trough elements 36 is shown as being an integral part of a tube 42 and the lower trough element 37 is shown as being an integral part of the lower tube 43. The upper tube 44 is arranged with tubes 42 and 43 in a diamond-shaped cross-sectional arrangement corresponding to the arrangement of the arcuate troughs 36, 37, 39 and 40 when the doors are in the closed position of FIGURE 4. Consequently, the tubular troughs 39 and 40 will be axially aligned with corresponding portions of the tubes 42 and 44 when the doors are in closed position.

To form the hay wafers, it is necessary both to compact the charge of hay mixture in the compacting chamber and to extrude it through tubes 42, 43 and 44 in packed condition. Such compacting of the hay mixture charge, packing of such mixture in the tubes 42, 43, and 44 and extrusion of such mixture through the tubes is effected simultaneously with the operation of transferring each charge successively from the compaction chamber to the tubes. Such compacting, transferring and tube packing operations are accomplished by reciprocation through the compaction chamber of a close fitting plunger composed of a cluster of tubes or rods including lateral elements 45, a lower element 46 and an upper element 47. If these elements are tubular it will be necessary for their ends adjacent to the compaction chamber to be closed. Such tubes or rods will be in registry, respectively, with the ends of the tubes 42, 43 and 44 and will have an exterior cross-sectional shape corresponding to and of a size to fit the internal cross-sectional shapes of the corresponding tubes 42, 43 and 44 and the trough elements of the compaction chamber when the doors are in closed position.

Figure 3:
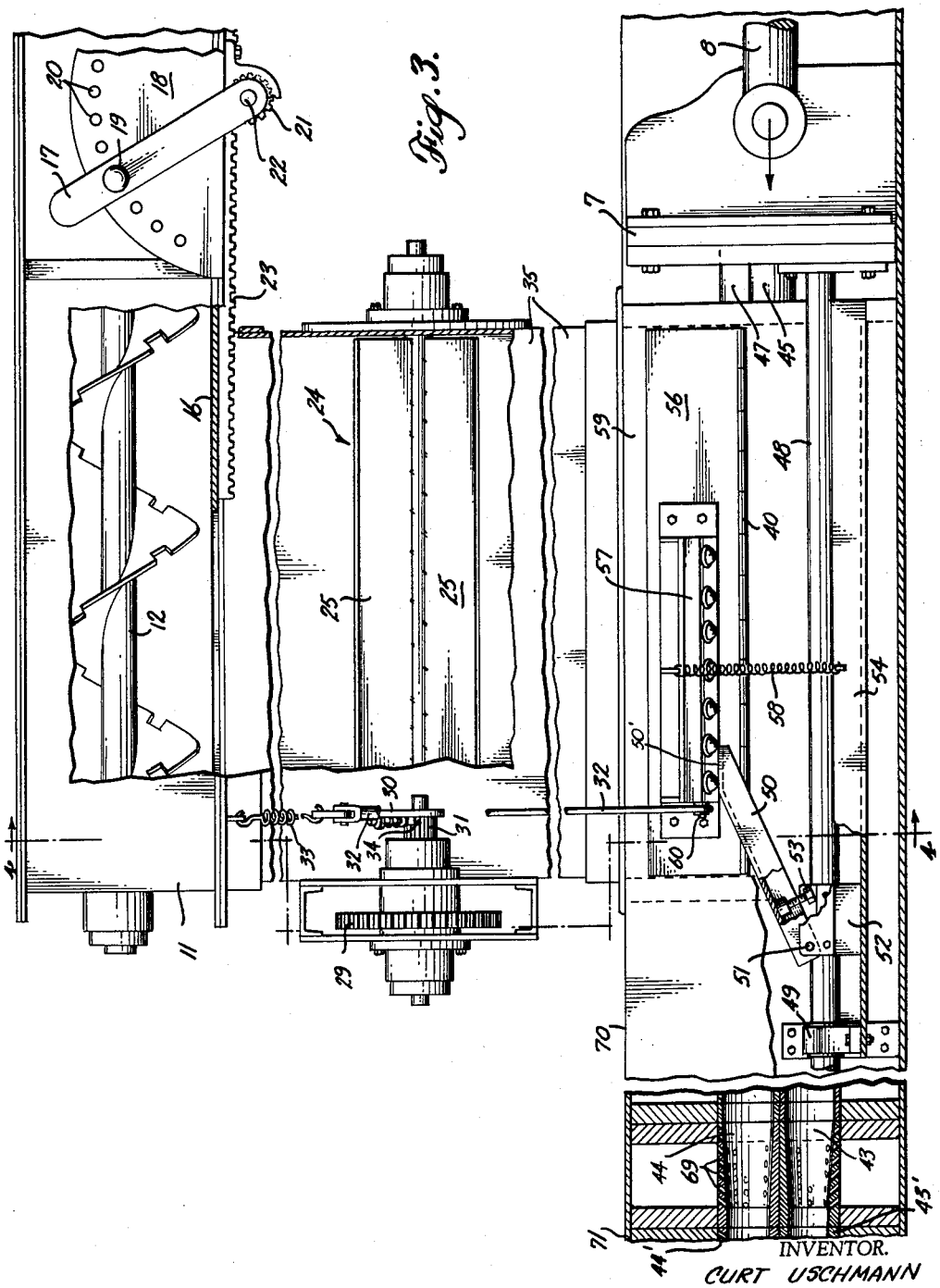
FIGURE 3 is an enlarged side elevation view of a portion of the wafer making machine with parts broken away.

The plunger elements 45, 46 and 47 are mounted on the compacting head 7 of the hay baler as shown in FIGURES 1 and 3 and are reciprocated by it. It is important, of course, that the compaction chamber doors be closed while the plunger is moving through its compaction stroke. Consequently, in addition to the plunger elements 45, 46 and 47, door closing actuators are connected to the reciprocable head 7. Such door actuators include rods 48 extending along opposite sides of the compaction chamber and each having an end connected to the compacting head 7. The other end portion of each rod 48 is slidably received in a guide 49.

On the portion of each rod between its end anchored to the compacting head 7 and the guide 49 is mounted a presser arm 50 inclined upward from the rod. Preferably the angle of inclination is adjustable by mounting such rod on a pivot 51 carried by a block 52 on the rod 48. The angle of inclination of the arm 50 to the rod can be adjusted by screwing in or out a regulating screw 53. Each block 52 is guided for accurate movement and to resist thrust by having its lower portion slidably received in a guide channel 54 shown in FIGURES 3, 4 and 5. Such support of the block will insure that it cannot rotate about the axis of rod 48 either with such rod or independently of it.

To the panel 38 of each door are secured sector-shaped braces 55 on which are mounted thrust plates 56. Such thrust plates carry rows of thrust balls 57, respectively, and the angle between each thrust plate and its corresponding panel 38 as established by the segmental brackets 55 in conjunction with the mounting of the thrust balls will be such that such thrust balls move generally vertically as the compaction chamber doors swing between the open position of FIGURE 5 and the closed position of FIGURE 4. Such closing movement of the doors is effected by the wedging action exerted by the ends of arms 50 on the thrust ball rows as such arms are moved to the left as seen in FIGURE 3 during a compacting stroke of the plunger.

Each of the thrust balls is mounted for universal rolling on the beveled upper end surface 50' of the arm 50. Such beveled surface will be sufficiently long in the direction of movement of the plunger so that it will bridge between two of the thrust balls as shown in FIGURE 3 and, therefore, during the stroke of the plunger through the compaction chamber will always be in engagement with at least one of such balls to hold the cover closed. Not only are the covers held closed by such engagement of the upper ends of arms 50 with the thrust balls, but progressive engagement of the inclined arms with such thrust balls will swing the covers progressively from their open positions of FIGURE 5 to their closed positions of FIGURE 4 as the plunger moves toward the compaction chamber. Conversely, as the plunger is withdrawn from the compaction chamber sufficiently to move the upper end portion of each arm 50 out of engagement with the thrust balls 57, the doors will open progressively as the ball farthest to the right as seen in FIGURE 3 rides down the incline of the arm.

While the doors may be designed or counterbalanced in a manner such that they will always tend to swing away from each other toward open position about their hinges, such opening action can readily be effected by connecting each cover to the frame of the apparatus by a tension spring 58 which will be stressed increasingly as the doors are swung toward closed position. Such springs will hold the ball rows 57 firmly against the upper end portions of arms 50 or hold the panels 38 against the stop flanges 59 when the doors are to be kept fully open. Conversely, these flanges limit closing movement of the covers when they are engaged by the thrust plates 56 as shown in FIGURE 4. The screw 53 will be adjusted to set the inclination of arm 50 in proper position to avoid a condition where the pressure of the arm on the thrust balls 57 produces excessive pressure of the thrust plate 56 against the stop flange 59. The possibility of such an occurrence can be reduced by utilizing resiliently mounted thrust balls 57.

Assurance that the charge dumping mechanism will always operate in proper synchronism with the doors for the compacting chamber results from connecting the charge dumper actuating connecting rod 32 to the thrust mechanism for a door. In FIGURES 4, 5 and 6 the connecting rod is shown as being pivotally connected to the end of a ball thrust device 57 by a pivot 60. The lower end of such connecting rod will move upward and downward generally linearly as the compaction chamber covers are swung between open and closed position because, as mentioned previously, the thrust ball devices are mounted relative to the panels 38 so as to move generally vertically during swinging of the doors.

Reciprocation of the plunger elements to the left in FIGURES 1, 3 and 6 first will move the new hay mixture charge to the left as seen in these figures until it begins to move into the tubes 42, 43 and 44. Such charge will be divided between the tubes by the ridged anvil member 61 which spans between the adjacent portions of the tubes. As the plunger nears the end of its compaction stroke, a filler block 62 interengaged between the plunger elements 45, 46 and 47 as shown in FIGURE 6 will come into contact with the farthest projecting portion of the anvil ridge and will sever any portion of the mixture extending across such ridge so that the entire charge can be forced into the several tube elements.

The filler block 62 is mounted for yielding relative to the plunger elements 45, 46 and 47 by carrying guide rods 63 which slide through apertures in a stationary block 64 anchored to such plunger elements. Normally, the filler block 62 is held in its most advanced position relative to the plunger elements 45, 46 and 47 by compression springs 65 interengaged between such filler block and such anchor block. Collars 66 on the guided ends of rods 63 limit movement of the filler block to the left by the compression force of the springs. When the filler block strikes the anvil 61, however, the plunger elements 45, 46 and 47 can continue their movement into the tubes 42, 43 and 44 while movement of the filler block will be arrested, and the remainder of the plunger can continue its travel because of the yielding action of springs 65 as the rods 63 slide in the apertures of anchor block 64.

The anvil 61 is mounted stationarily in the position shown in FIGURES 6 and 7 by two rods 67 extending between the tubes 42, 43 and 44 and having their ends secured to or formed integrally with the anvil 61. The ends of such rods remote from the compaction chamber can be secured in any suitable manner. Also, it will be noted in FIGURE 7 that arms of the anvil extend just far enough along the peripheries of the tubes so as to contact the junctions of the arcuate troughs 36, 37, 39 and 40. Consequently, on the return stroke of the plunger, only the small amount of hay mixture between the surfaces of the anvil 61, the filler block 62 and the plunger elements 45, 46 and 47 will remain not pushed into the tubes 42, 43 and 44. As the plunger is retracted from the tubes, the springs 65 will expand until the collars 66 engage block 64, whereupon the filler block 62 will be drawn away from the anvil 61 to enable such small amount of material to be dropped back into the compaction chamber for mixing with the next charge.

As the hay mixture is pushed into and through the tubes 42, 43 and 44 by the plunger, the mixture will be extruded progressively along such tubes. During such movement, the mixture preferably is dried to a greater or lesser extent by the tubes 42, 43 and 44 being heated. Such heating may be effected by heaters 68 shown in FIGURE 2, which preferably are gas fired and of the radiant type having ceramic elements which are heated by the gas to heat-radiating temperatures. Water vapor evaporated from the hay mixture in the tubes 42, 43 and 44 can escape from such tubes through apertures 69 provided at least in their opposite sides but, preferably, around the entire circumference of each tube. To prevent these apertures from becoming clogged by the hay mixture, they are inclined from the inner wall of each tube outwardly in the direction opposite to the direction of movement of the hay mixture through the tubes as indicated in FIGURE 3.

To increase the packing of the hay mixture as it is packed in each tube and to compensate for shrinkage of the mixture by evaporation of water from it, it is preferred that the wall thickness of each tube increase gradually toward its discharge end as shown in FIGURE 3. Resistance of the material to movement through the tube can thus be maintained so that additional charges of material will be packed solidly into the tube as the plunger compacts and feeds each additional charge. If green hay, rather than cured or partially cured hay, is processed by this equipment, it will be desirable to provide additional drying facilities. As shown in FIGURE 1, to the first forming tube section 70 can be added a further forming and drying tube section 71 which may be of any desired length. The first section 70 may, for example, be approximately two and one-half feet long and the additional section 71 may be approximately five feet long, or longer in order to permit sufficient drying.

The construction of such additional section 71 is similar to the construction of the section 70 including additional tube sections 42', 43' and 44' and additional heaters 68'. While, as has been discussed above, the wafer making mechanism is installed in the compaction chamber of a hay baling machine, such additional forming tube and drying section 71, at least, would be too long to be received in such a chamber and, quite possibly, even the forming tube section 70 would project beyond the discharge end of such a chamber. Consequently, as shown in FIGURE 1, such extension section 71 may be supported by angles 72 which may be carried in cantilever fashion by angle supports 73 and secured in position by suitable clamping means 74.

As the packed and dried hay mixture is expelled from the ends of the tubes 42, 43 and 44 of the forming tube section 70, if only this section is used, or from the ends of tubes 42', 43' and 44' of extension section 71, the expelled material will be unsupported. Because of the cleavage planes formed between each charge of material, successive increments of the packed mixture usually will break off automatically into wafers having a circumference corresponding to the cross sectional shape of the forming tubes and a thickness corresponding to the quantity of charge compacted by each stroke of the plunger. If the sections of the expelled material did not separate automatically as indicated in FIGURE 1, those which did not separate would be stuck together so insecurely that they probably would break apart during subsequent handling and, in any event, it would not be particularly detrimental if occasional wafers did stick together.

Conveniently, a bucket elevator 75 can be located at the discharge end of the forming tube section of the apparatus as shown in FIGURES 1 and 2 to receive the wafers as they break apart and convey them into a storage bin or wagon body. If the apparatus is operated as a mobile unit, such bucket conveyor and storage bin can be mounted on a wheeled chassis 76 connected to the chassis 1 of the hay baler by a draw rod 77. At any time that it is desired to use the hay baler for baling hay, the plunger of the wafer making machine and the rods 48 can be disconnected quickly from the compacting head 7 of the hay baler and the entire wafer making machine withdrawn from the baling chamber so that the baler can be used for its originally intended purpose.

While the construction and operation of the hay wafer making machine has been described in connection with a compaction chamber and forming tube arrangement including four tubes disposed in diamond-shaped relationship, the number of tubes used could be greater or smaller, arranged in different relationship and of different cross section, if desired. Other representative arrangements of tubes are shown in FIGURES 8, 9, 10 and 11 and it is believed to be unnecessary to describe such arrangements in detail. In general, the tubes and tube elements of FIGURE 8 are arranged in hexagon-shaped pattern with a central tube so as to provide seven forming tubes and corresponding trough arrangements in the compaction chamber. The covers for such chamber will be virtually the same as the covers previously described and shown in FIGURES 4, 5 and 6. In this instance, the anvil will be of generally hexagon shape.

Alternatively, the number of tubes used can be reduced to two as shown in FIGURE 9. In this instance, of course, it will be necessary to provide a somewhat different arrangement of trough sections carried by the covers as shown in that figure.

In FIGURE 10, the forming tubes again are arranged in a diamond-shaped pattern of four tubes but, in this instance, each tube is of hexagonal cross section. By utilizing this shape, the tube walls fit together more closely. In FIGURE 11 tube and tube sections of square cross section are shown arranged in square-shaped relationship. In both of these instances, straight anvils are provided and the cover structures are modified as required by such tube arrangements. The details of construction of the alternate forms shown in FIGURES 8, 9, 10 and 11, will, however, follow in principle those described in connection with the preferred form of the invention discussed above.

This hay wafer making machine can also be built as an independent machine unit separate from the hay baler adaptation.

I claim as my invention:

1. A hay wafer making machine comprising a compaction chamber, a forming tube having one end communicating with said compaction chamber, plunger means reciprocable through said compaction chamber for pressing hay from said compaction chamber into the end of said forming tube communicating with said compaction chamber, hinged door means, and wedging means linearly reciprocable by said plunger means along a path substantially parallel to the hinge axis of said door means and engageable with said door means for closing said door means and maintaining said door means closed while said plunger means are pressing hay from said compaction chamber into such forming tube end.

2. A hay wafer making machine comprising a compaction chamber, a cluster of forming tubes each having one end communicating with said compaction chamber, the bottom of said compaction chamber being composed of arcuate troughs of sizes and shapes corresponding to portions of the tubes in said tube cluster and disposed in continuation thereof, and said compaction chamber including cover means having mounted thereon troughs of sizes and shapes corresponding to portions of tubes of said cluster and extending in continuation thereof when said cover means are closed, means for supplying chopped hay to said compaction chamber when said cover means are open, and means including an element conforming generally in size and shape to each tube of said cluster disposed generally in longitudinal registry with the respective tubes and movable relative to said compaction chamber and said forming tubes for pressing hay from said compaction chamber into the ends of said forming tubes communicating with said compaction chamber.

3. A hay wafer making machine comprising a compaction chamber, a cluster of forming tubes each having one end communicating with said compaction chamber, the bottom of said compaction chamber being composed of arcuate troughs of sizes and shapes corresponding to portions of the tubes in said tube cluster and disposed in continuation thereof, and said compaction chamber including cover means having mounted thereon troughs of sizes and shapes corresponding to portions of tubes of said cluster and extending in continuation thereof when said cover means are closed, means for supplying chopped hay to said compaction chamber when said cover means are open, and plunger means including individual cylindrical elements corresponding respectively to the forming tubes of said cluster and each being of a size substantially equal to and disposed in longitudinal alignment with its corresponding tube, and means for reciprocating said plunger elements through said compaction chamber to the ends of said forming tubes for pressing hay from said compaction chamber into the ends of said forming tubes communicating with said compaction chamber.

4. A hay wafer making machine comprising a cluster of a plurality of forming tubes disposed in substantially parallel arrangement, a compaction chamber having a bottom composed of a plurality of troughs extending in prolongation of portions of said tubes of said tube cluster, and door means for closing the upper portion of said compaction chamber and including troughs extending in prolongation of portions of said tubes of said cluster when said door means are in closed position, means for supplying chopped hay to said compaction chamber when said door means are open, plunger means reciprocable through said compaction chamber and including cylindrical elements corresponding to the tubes of said tube cluster, respectively, disposed in lengthwise registry therewith and reciprocable through said compaction chamber to said forming tubes for pressing hay from said compaction chamber into said forming tubes, and means movable by movement of said plunger means toward said tubes and engageable with said door means for maintaining said door means in closed position during movement of said plunger through said compaction chamber toward said tubes.

5. The machine defined in claim 4, and ridged anvil means mounted centrally of the tube cluster adjacent to the compaction chamber, and filler block means mounted between the ends of said plunger cylindrical elements and yieldable relative thereto for engagement with said anvil means by reciprocation of said plunger means to sever hay between the tubes as said plunger elements approach the ends of said tubes.

6. A hay wafer making machine comprising a compaction chamber, means for supplying chopped hay to said compaction chamber, a cluster of forming tubes, each tube having one end communicating with said compaction chamber, plunger means reciprocable through said compaction chamber to the ends of said forming tubes and including tube-registering portions for pressing hay from said compaction chamber into the ends of said forming tubes communicating with said compaction chamber and a filler portion between said tube-registering portions and movable relative to said tube-registering portions, and ridged anvil means mounted at the junction of said tubes and engageable by said plunger filler portion for severing hay between the ends of said tubes communicating with said compaction chamber and arresting movement of said filler portion while said tube-registering portions continue their movement.

7. A hay wafer making machine comprising a compaction chamber, a forming tube having one end communicating with said compaction chamber, means for supplying chopped hay to said compaction chamber including two plates disposed above the compaction chamber at an angle and an arcuate wall bridging between the edges of said plates, defining a measuring chamber for holding a charge of chopped hay therebetween, means guiding said plates for swinging simultaneously about the same axis in the same direction for dumping such hay into said compaction chamber, pressing means reciprocable relative to said compaction chamber and said forming tube for pressing hay from said compaction chamber into the end of said forming tube communicating with said compaction chamber, and plate-moving means operatively connected to said pressing means for movement by reciprocation of said pressing means to effect charge-dumping swinging of said plates.

8. A hay wafer making machine comprising a compaction chamber, means for supplying chopped hay to said compaction chamber, a cluster of forming tubes, each such tube having one end communicating with said compaction chamber, ridged anvil means between adjacent tubes of said cluster at the end thereof communicating with said compaction chamber, and plunger means movable relative to said compaction chamber in a direction lengthwise of said forming tubes, said plunger means including elements of a size and shape corresponding to said forming tubes to fit snugly, respectively, and move into the ends of said forming tubes communicating with said compaction chamber for pressing hay into said tubes, and yieldable means between said elements, movable toward said ridged anvil means to force hay thereagainst for severing it.

9. A hay wafer making machine comprising a compaction chamber, a forming tube having one end communicating with said compaction chamber, plunger means reciprocable through said compaction chamber for pressing hay from said compaction chamber into the end of said forming tube communicating with said compaction chamber, hay supply means, constant volume charge-holding means above said compaction chamber bodily displaceable to segregate a charge of chopped hay from said hay supply means and transfer such charge in constant volume condition into position for dumping it into the path of said reciprocable plunger means in said compaction chamber, and means connected to said charge holding means and to said plunger means and actuated by reciprocation of said plunger means away from said forming tube to effect charge-dumping displacement of said charge-holding means.

References Cited in the file of this patent

UNITED STATES PATENTS

| 72,573 | Weissenborn | Dec. 24, 1867 |
| 729,149 | Fenn | May 26, 1903 |
| 810,998 | Thomas | Jan. 30, 1906 |
| 2,360,487 | Fullerton | Oct. 17, 1944 |
| 2,810,181 | Rockstuhl | Oct. 22, 1957 |
| 2,817,891 | Zweigle | Dec. 31, 1957 |
| 2,833,633 | Hecht | May 6, 1958 |
| 2,942,976 | Kosch | June 28, 1960 |

FOREIGN PATENTS

| 66,975 | Austria | Nov. 10, 1914 |